3,006,751
METHOD FOR DESUCKERING TOBACCO
William H. Brugmann, Jr., Milltown, N.J., and Howard L. Yowell, Newbury, England, assignors to Standard Oil Development Company, a corporation of Delaware
No Drawing. Filed Nov. 26, 1954, Ser. No. 471,507
2 Claims. (Cl. 71—2.7)

The present invention relates to improved agricultural compositions such as horticultural and crop spray oils and tobacco desuckering oils. More particularly, the present invention relates to an improved agricultural composition for desuckering tobacco plants and eliminates, or minimizes plant injury at times caused by currently available desuckering oil compositions and horticultural spray oils.

Tobacco is a billion dollar crop in the United States. Much of the labor required to grow this crop is spent in manually breaking out the sucker buds to increase the leaf yield and quality. In this way, all available plant nutrients could be utilized in producing large uniform leaves. It is customary to break the main leader by hand when the tobacco plant begins to flower, an operation called "topping." When this is accomplished, the plant nutrients induce rapid development of sucker growth at the juncture of the stem and each leaf. In the past, to obtain the largest leaves possible, the suckers have been removed by hand as often as three times in one season, and is a costly operation in terms of manpower.

A marked step forward was taken when it was found that certain chemicals and certain oils, particularly mineral oils, alone or in the form of emulsions, had the property of desuckering tobacco and tomato plants without adversely affecting tobacco or tomato quality. Numerous types of petroleum mineral oils may be used for this purpose. Petroleum mineral white oils are particularly suited for this purpose if they are mainly paraffinic and/or naphthenic, such as are prepared by exhaustive sulfuric acid treatment of selected petroleum distillates whereby substantially all aromatics and heterocyclic materials are removed, thus decreasing the phytotoxicity of the oil. These acid-treated oils have specific gravities in the range of about .750–.950, a viscosity range SUS at 100° F. of 80–600, and a boiling range predominantly of about 300–1000° F.

Though this represents a significant step forward in the art, not all problems associated with the use of white oil desuckering agents disappeared. Thus, when the oil, either alone or as an emulsion, is applied onto the topped plants, there is a tendency for the composition to be splattered on the tobacco leaves as well as on the suckers. Thus, compositions applied from the present "Clip-Oil" machines, frequently are splattered on the leaves. This misdirected spray causes the leaves to be burned, resulting ultimately in consumer dissatisfaction.

Since oil and emulsions flow rapidly (within 24 hours) to the ground line of the plant, there has been observed frequently severe rotting, particularly under moist conditions, as a result of attacking secondary soil organisms.

The use, therefore, of mineral oils for desuckering tobacco has hitherto been accompanied, to some extent, by plant burning and injury to the nodes and stalks, and susceptibility to disease. The latter is most prevalent in burley tobacco during the humid season. The disease organisms apparently enter the plant through lesions such as are caused by stalk and node burns. Elimination of the causes of the latter would, therefore, minimize the disease.

It is, therefore, the principal object of the present invention to set forth a desuckering composition and horticultural and crop spray oil which overcomes the defects of the prior art, decreases markedly the harmful burning action of mineral oil on stalks and nodes of plants, and minimizes soft rot disease, and in general reduces the phytotoxic properties of desuckering oils and horticultural spray oils.

It has now been found that this object may be accomplished by incorporating in a mineral oil or mineral oil emulsion, non-phytotoxic concentrations of an alkylene bisphenol. The mechanism of stem and node burning in tobacco is not proven, but it is theorized that it may be related to oxidation of the desuckering oil after it has been applied to the tobacco. Ultraviolet light rays catalyze the oxidation of residual desuckering oil films on treated tobacco. The hydrocarbon oxidation products thus formed are known to be injurious to plant tissue and thus produce stalk and node injury by killing the oil-sensitized cells of the treated plants. In accordance with the present invention, there are added to the desuckering oil, compounds which stabilize the oil and retard its oxidation, and thus minimize or prevent completely stem and node burn injury to treated tobacco plants. The protective agents may be incorporated in the oil at a concentration range of 0.001–5.0 wt. percent. When the desuckering oil is to be applied in the form of an emulsion, the agents may be added to either the oil or water phase.

Though a large number of compounds have anti-oxidant properties, great care must be exercised in employing compounds for the purpose of the present invention. This is because many of these compounds are themselves phytotoxic or exhibit maximum concentrations above which they become phytotoxic. That is, they even accentuate the burning of plant tissue. In accordance with the present invention, therefore, protective agents are employed as additives to tobacco desuckering oils only in carefully determined non-phytotoxic concentrations. These concentrations, of course, depend on the "inherent" phytotoxicity of the compound itself.

A further problem results from the use of desuckering oils as aqueous emulsions. Their use has many advantages, particularly in decreasing soft-rot incidence in the tobacco plant. However, emulsifying agents generally have phytotoxic characteristics, and it has been found that the protective agents of this invention counteract the phytotoxic tendencies of the emulsifiers.

Protective agents particularly suitable for incorporation in horticultural spray oils and tobacco desuckering oils are the following:

I. Alkylene bisphenols and alkylated alkylene bisphenols, such as 2,2'-methylene bis-(4-methyl-6-tertiary butyl phenol), 2,2'-methylene-bis-(didodecyl phenol) and 4,4'-isopropylidine bis(2-isopropyl phenol). The alkylene radical may contain from 1–4 carbon atoms, while the total number of carbon atoms in the alkyl side chain may vary from 3 to 30, and the chains may be either straight or branched. Also included are salts of these compounds, such as Li, K, Na, Ca, Ba, Zn, Cu, Sr, etc.; $NH_4$ salts, or amine or alkanol amine salts.

The ranges of concentration of the ingredients of the composition to accomplish the deserved results have been found to be as follows, when an emulsion of the mineral oil is employed:

99.989 to 75.0 vol. percent petroleum mineral white oil
0.1 to 20.0 vol. percent oil-soluble emulsifier
0.001 to 5.0 wt. percent protective agent Before using, this concentrate is emulsified with enough water to give a concentrate to water ratio of 1/2 to 2/1. For example, aqueous emulsions containing 50% oil, 0.2–1.0% emulsifier, and 0.1–0.2% protective agent have been found to be especially effective. It is understood that the anti-oxidants of the invention may also be dissolved in the unemulsified mineral oil and then applied to the plants through this is not the preferred operation.

The suckers may be killed by applying the composition of this invention, emulsified with water, just below the exposed surface of the freshly "topped" tobacco plant. The killing action of the oil seems to take place after it runs down the stem and reaches the active sucker tissue. The presence of the anti-oxidant in the emulsion acts to prevent injury and minimize the entrance of active disease organisms at this point.

The emulsion may be applied by swab, paint brush, pressure oil can, dropper, or other convenient means. Special applicators have been developed to "top" and apply emulsion simultaneously, e.g., the "Clip-Oil" (patent applied for) described in Information Series Bulletin No. 3, October 1950, Department of Agricultural Engineering, North Carolina Agricultural Experiment Station. Field experiments have shown that an application of about 3 cubic centimeters (0.1 ounce) of emulsion to each plant will control about 85–95% of the suckers. This means that an acre of tobacco may be treated with 5 gallons of emulsion containing 2.5 gallons of the composition of this invention. Smaller applications per plant usually will give poorer sucker control, while larger amounts will not appreciably improve the control and may cause injury.

The following examples illustrate this invention and indicate test results obtained with the compositions of this invention emulsified with water.

EXAMPLE I

A petroleum mineral white oil having a viscosity of 150 SSU @ 100° F. was tested as a sucker control composition. The oil was applied as a 50% emulsion, with 1% of a commercially available non-ionic emulsifying agent, "Antarox A–401" (a condensation product of an alkyl phenol and ethylene oxide having the general formula

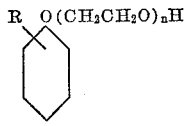

$$R-O(CH_2CH_2O)_nH$$

The oil was tested with and without additives. The data below shows results obtained in a field test conducted on burley tobacco, and are based on observations of 40 plants treated with the oil.

|  | 150 vis. White Oil [1] +0.2% 2,2′ Bis (2-hydroxy-3-tert-butyl-5-methyl phenyl propane | 150 vis. White Oil [1] +0.2% 2,2′ methylene Bis-(4-methyl-6-tert-butyl phenol | 150 vis. White Oil [1] |
|---|---|---|---|
| Percent Sucker Control | 96 | 80 | 89. |
| Present injury rating:[2] | | | |
| Node burn | none | none | mod. to heavy. |
| Stalk Burn | do | do | Do. |
| Soft Rot Disease, Percent: | | | |
| Node [3] | 1.0 | do | 7.0. |
| Stalk [4] | none | do | 5.0. |
| Base [4] | do | do | none. |

[1] Applied as 50% emulsion.
[2] Visual estimations.
[3] Based on counts in 20 plants per plot (300 total suckers).
[4] Based on counts in 40 plants per plot.

In addition to the data in the above table, tests were conducted to determine the effectiveness of anti-oxidants of the bisphenol type in base stocks of varying viscosities. Previous field test results had shown that low viscosity base oils caused more severe node and stalk burn than higher viscosity oils. Therefore, it was felt desirable to establish whether a low viscosity tobacco desuckering oil base containing a bisphenol type anti-oxidant could be employed without causing tobacco injury. Results obtained in this phase of the field test are summarized in the following table:

*Effect of base oil viscosity on the performance of 0.2% of 2,2′-methylene-bis (4-methyl 6-tert. butyl phenol)*

[Applied as 50% emulsions]

| Oil Viscosity SSU at 100° F. | Percent Sucker Control [1] | Plant Injury Rating [2] | | Soft Rot Disease, Percent | | |
|---|---|---|---|---|---|---|
| | | Node Burn | Stalk Burn | Node [1] | Stalk [3] | Base [3] |
| 30 | 86 | Slight | Slight | None | None | None. |
| 88 | 88 | None | None | do | do | Do. |
| 150 | 80 | do | do | do | do | Do. |
| 205 | 87 | do | do | do | do | Do. |
| 348 | 93 | do | do | do | do | Do. |
| 150 (no anti-oxidant) | 89 | (4) | (4) | 7.0 | 5.0 | Do. |

[1] Based on count of 20 plants per plot.
[2] Visual estimates.
[3] Based on count of 40 plants per plot.
[4] Mod. to heavy.

These data clearly indicate that anti-oxidants of the bisphenol type are very effective retardants of burley plant injury and soft rot disease in tobacco desuckering oil base stocks ranging from 30 to 350 Salbolt seconds viscosity at 100° F.

As indicated the foregoing examples were collected from observations made after application of the desuckering formulations to field grown burley tobacco plants. Burley tobacco is one of two major tobacco types grown in the United States (flue-cured being the other). Normally, burley tobacco is grown under somewhat lower temperatures and conditions of sunlight intensity than is flue-cured. Thus, flue-cured tobacco is often even more susceptible, after oil emulsion desuckering, to hot weather node and stalk injury. Though emulsion treated flue-cured tobacco does not suffer from soft rot disease as does burley tobacco, hot weather node burn injury causes an equally severe problem, that of leaf drop. Such leaf drop occurs when the leaf-stalk juncture point is sufficiently weakened by hot weather burn to cause partial or total defoliation of the plant.

The following examples show the effectiveness of certain anti-oxidants in minimizing or eliminating node burn and leaf drop in flue-cured tobacco. The data were obtained on field grown tobacco under extremely severe conditions of high temperature and sunlight intensity.

EXAMPLE II

The data in this example are based on the observation of 25 mature flue-cured tobacco plants treated with emulsions of various mineral oils ranging in viscosity from 150 to 520 Saybolt seconds viscosity at 100° F. These oils were tested with and without anti-oxidants. Temperatures and sunlight intensity at the time of, and following, application of the test materials, were very high.

fied with a minor amount of a non-ionic emulsifier. The alkyl aryl polyoxyethylene glycol ethers are also effective.

| Basic Desuckering Formulation | Viscosity (SUS/100° F.) | Additive (Wt. Percent) | Sucker Control, Percent | Node Burn Rating [1] | Reduction in Node Burn, Percent | Leaf Drop [2] | Reduction in Leaf Drop, Percent |
|---|---|---|---|---|---|---|---|
| Base Oil A [3]+0.8% non-ionic emulsifier A [4] | 150 | None | 91 | 4.1 | | 21 | |
| | | 0.1% methylene bis-(4-methyl-6-tert. butyl phenol) | 92 | 1.7 | 59 | 0 | 100 |
| Base Oil B [5]+1.4% non-ionic emulsifier B [6] | 200 | None | 80 | 2.2 | | 6 | |
| | | 0.1% methylene bis-(4-methyl-6-tert. butyl phenol) | 94 | 0.7 | 69 | 0 | 100 |
| Base Oil C [7]+1.4% non-ionic emulsifier B [6] | 500 | None | 85 | 2.7 | | 12 | |
| | | 0.1% methylene bis-(4-methyl-6-tert. butyl phenol) | 91 | 1.7 | 37 | 0 | 100 |
| Base Oil B [5]+0.8% non-ionic emulsifier B [6] | 200 | None | 80 | 2.2 | | 2 | |
| | | 0.2% di tert. butyl p-cresol | 89 | 2.9 | −32 | 6 | −200 |
| Base Oil D [8]+1.4% non-ionic emulsifier B [6] | 350 | None | 89 | 1.4 | | 4 | |
| | | 0.1% di tert. butyl p-cresol | 92 | 1.1 | 20 | 2 | 50 |

[1] 0=none.
 1=V. slight.
 2=slight.
 3=slight-moderate.
 4=moderate.
 6=heavy.
[2] Based on 30 plants (600 leaves).
[3] Paraffinic white oil (Vis. SSU 150 at 100° F., Sp. Gr.=0.875 at 60° F.f Distillation Range 255–620° F.).
[4] $O(CH_2CH_2O)_nH$,

[5] Paraffinic white oil (Vis. SSU 200 at 100° F., Sp. Gr.=0.900 at 60° F., Distillation Range 386–644° F.).
[6] $O(CH_2CH_2O)_nH + RCOO(CH_2CH_2O)_nH$

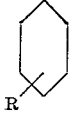

[7] Solvent refined pale oil (Vis. SSU 500 at 100° F., Sp. Gr.=0.8 at 60° F., Distillation Range 260–600° F.).
[8] Paraffinic white oil (Vis. SSU 343 at 100° F., Sp. Gr.=0.886 at 60° F., Distillation Range 406–620° F.).

From the data in Example II it is evident that not all anti-oxidants are equally effective in reducing or eliminating plant injury and leaf drop in emulsion desuckered tobacco. This is especially true when the temperature and light intensity are severe during and after treatment, as was the case in the above example. It will be noted that a minor amount of methylene bis-(4-methyl-6-tert. butyl phenol) added to mineral desuckering oils ranging from 150 to 500 SUS/100° F. viscosity reduced node burn injury from about 40 to 70% and crop loss due to leaf drop 100% compared to the formulations without the additive. On the other hand a minor amount of di tert. butyl p-cresol added to the same and similar desuckering oils was only partially effective in the concentrations employed in one case and in the other actually increased the degree of node burn and leaf drop.

The requirements for the emulsifying agents employed are somewhat specific in nature, i.e., not all emulsifying agents are desirable in the compositions of this invention because of their high degree of phytotoxicity. However, both synthetic, oil-soluble non-ionic and anionic emulsifying agents may be used. Typical emulsifiers by trade name and chemical description are as follows: Antarox A–401, alkyl aryl polyoxyethylene glycol ether; Nonisol 210, polyethylene glycol oleate; Triton X45, alkylated aryl polyether alcohol; and a petroleum sulfonate modi-

What is claimed is:
1. An improved process for desuckering tobacco plants which comprises applying to said plants an aqueous emulsion comprising a highly refined petroleum white oil, 0.1 to 20 volume percent of a non-ionic emulsifying agent based on the oil, and 0.001 to 5.0 wt. percent based on the oil of 2,2′-methylene bis-(4 methyl-6-tertiary butyl phenol) to retard oxidation of the oil to phytotoxic materials.
2. An improved process for desuckering tobacco plants which comprises applying to said plants a refined petroleum white oil containing from 0.001 to 5.0 weight percent of 2,2′-methylene bis-(4 methyl-6-tertiary butyl phenol).

References Cited in the file of this patent
UNITED STATES PATENTS

| | | |
|---|---|---|
| 2,123,457 | Wilson | July 12, 1938 |
| 2,558,762 | Kohr et al. | July 3, 1951 |
| 2,570,402 | Stevens et al. | Oct. 9, 1951 |
| 2,675,366 | Pullman | Apr. 13, 1954 |
| 2,720,451 | Anderson et al. | Oct. 11, 1955 |

OTHER REFERENCES

"The Clip-Oil," Dept. Agr. Engineering, North Caroline Agr. Exp. Sta., October 1950, pages 5 and 6.
"Agricultural Chemicals," April 1950, page 99.